(12) United States Patent
Fredin et al.

(10) Patent No.: US 8,307,240 B2
(45) Date of Patent: Nov. 6, 2012

(54) SMALL COMPUTER SYSTEM INTERFACE INPUT OUTPUT (SCSI IO) REFERRAL

(75) Inventors: Gerald J. Fredin, Wichita, KS (US); Andrew J. Spry, Wichita, KS (US); Kenneth J. Gibson, Lafayette, CO (US); Ross E. Zwisler, Lafayette, CO (US)

(73) Assignee: Netapp, Inc., Sunnyvale, CA (US)

( * ) Notice: Subject to any disclaimer, the term of this patent is extended or adjusted under 35 U.S.C. 154(b) by 500 days.

(21) Appl. No.: 12/316,713

(22) Filed: Dec. 15, 2008

(65) Prior Publication Data

US 2010/0153767 A1    Jun. 17, 2010

(51) Int. Cl.
*G06F 11/00* (2006.01)
(52) U.S. Cl. .............. 714/5.1; 714/6.1; 714/6.2; 714/42
(58) Field of Classification Search ................ 714/5, 42, 714/5.1, 6.1, 6.2, 44
See application file for complete search history.

(56) References Cited

U.S. PATENT DOCUMENTS

| | | | |
|---|---|---|---|
| 7,366,846 B2 * | 4/2008 | Boyd et al. ................. | 711/144 |
| 8,041,984 B2 * | 10/2011 | Kalos ........................ | 714/3 |
| 2003/0097607 A1 * | 5/2003 | Bessire ...................... | 714/5 |
| 2006/0005074 A1 * | 1/2006 | Yanai et al. ................ | 714/5 |
| 2007/0192554 A1 * | 8/2007 | Higaki et al. ............... | 711/162 |
| 2008/0086618 A1 * | 4/2008 | Qi ............................ | 711/170 |
| 2009/0077338 A1 * | 3/2009 | Agombar et al. ........... | 711/170 |

* cited by examiner

*Primary Examiner* — Scott Baderman
*Assistant Examiner* — Sarai Butler
(74) *Attorney, Agent, or Firm* — Haynes and Boone, LLP

(57) ABSTRACT

The present invention is a method for communication between an initiator system and a block storage cluster. The method includes receiving a command at a first storage system of a block storage cluster. The command is transmitted by the initiator system to the first storage system via a network and includes a request for data. The method further includes transferring the stored data from the first storage system to the initiator system via the network when data requested in the data request is stored by the first storage system. The method further includes transmitting a referral response from the first storage system to the initiator system when a portion of the data requested in the data request is not stored by the first storage system, but is stored by a second storage system of the block storage cluster. The referral response indicates to the initiator system that: a) not all of the requested data was transferred; and b) that the second storage system stores the portion of the requested data.

20 Claims, 2 Drawing Sheets

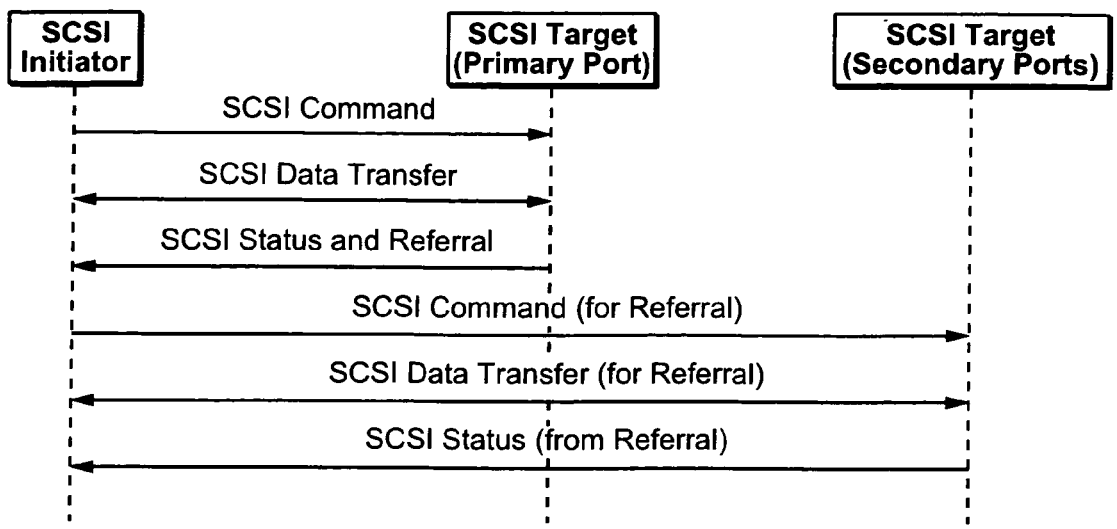
FIG. 2
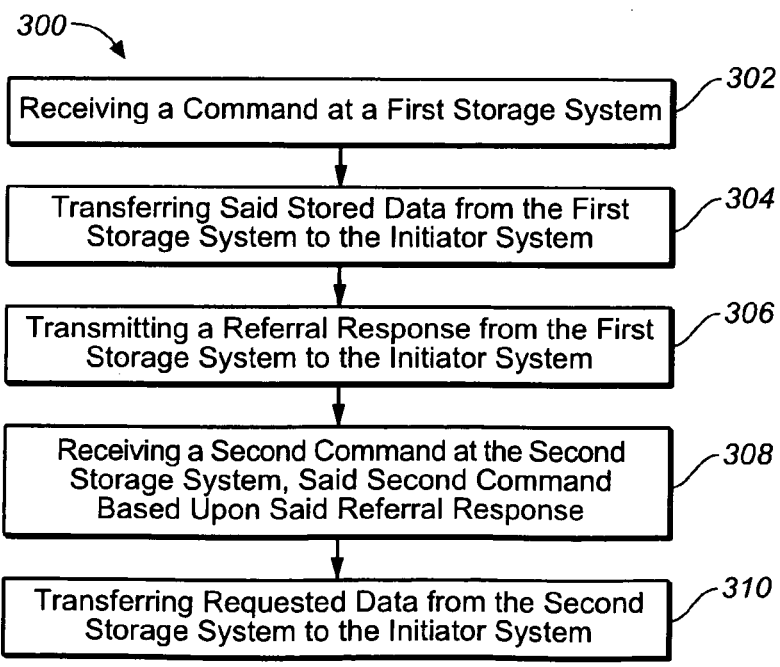
FIG. 3
| Port Identifier | Offset | Length |
|---|---|---|
| Port Identifier | Offset | Length |
| ⋮ | ⋮ | ⋮ |
| Port Identifier | Offset | Length |
FIG. 4

SMALL COMPUTER SYSTEM INTERFACE INPUT OUTPUT (SCSI IO) REFERRAL

CROSS-REFERENCE TO RELATED APPLICATIONS

The following patent application is incorporated by reference herein in its entirety:

| Attorney Docket No. | Express Mail No. | Filing Date | Ser. No. |
| --- | --- | --- | --- |
| LSI 08-1020 | EM 260722690 US | Dec. 15, 2008 | 12/316,778 |

FIELD OF THE INVENTION

The present invention relates to the field of networked storage accessed via a block storage protocol and particularly to a system and method for providing Small Computer System Interface (SCSI) referrals between an initiator system and a block storage cluster.

BACKGROUND OF THE INVENTION

Currently available systems/methods for providing block storage clustering may not provide a desired level of performance.

Therefore, it may be desirable to provide system(s)/method(s) for providing block storage clustering which address the above-referenced problems of currently available solutions.

SUMMARY OF THE INVENTION

Accordingly, an embodiment of the present invention is directed to a method for communication between an initiator system and a block storage cluster, including: receiving a command at a first storage system included in a plurality of storage systems of the block storage cluster, the command being transmitted by the initiator system to the first storage system via a network (ex.—a storage area network), the command including a request for data; when data requested in the data request is stored by the first storage system, transferring said stored data from the first storage system to the initiator system via the network; and when a portion of the data requested in the data request is not stored by the first storage system, but is stored by a second storage system included in the plurality of storage systems of the block storage cluster, transmitting a referral response from the first storage system to the initiator system, wherein the referral response provides an indication to the initiator system that not all of the requested data was transferred and further provides information for directing the initiator system to the second storage system.

An additional embodiment of the present invention is directed to a computer-readable medium having computer-executable instructions for performing a method for communication between an initiator system and a block storage cluster, said method including: receiving a command at a first storage system included in a plurality of storage systems of the block storage cluster, the command being transmitted by the initiator system to the first storage system via a network, the command including a request for data; when data requested in the data request is stored by the first storage system, transferring said stored data from the first storage system to the initiator system via the network; and when a portion of the data requested in the data request is not stored by the first storage system, but is stored by a second storage system included in the plurality of storage systems of the block storage cluster, transmitting a referral response from the first storage system to the initiator system, wherein the referral response provides an indication to the initiator system that not all of the requested data was transferred and further indicates to the initiator system that the second storage system stores said portion of the requested data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 2 is a block diagram schematic of a SCSI command/response remote procedure call with referral, as implemented by/in accordance with exemplary embodiments of system/method of the present invention;

FIG. 3 is a flow chart illustrating a method for communication between an initiator system and a block storage cluster, in accordance with an exemplary embodiment of the present invention; and FIG. 4 is a diagram of a SCSI referral format in accordance with an exemplary embodiment of the present invention.

DETAILED DESCRIPTION OF THE INVENTION

Figure 1:
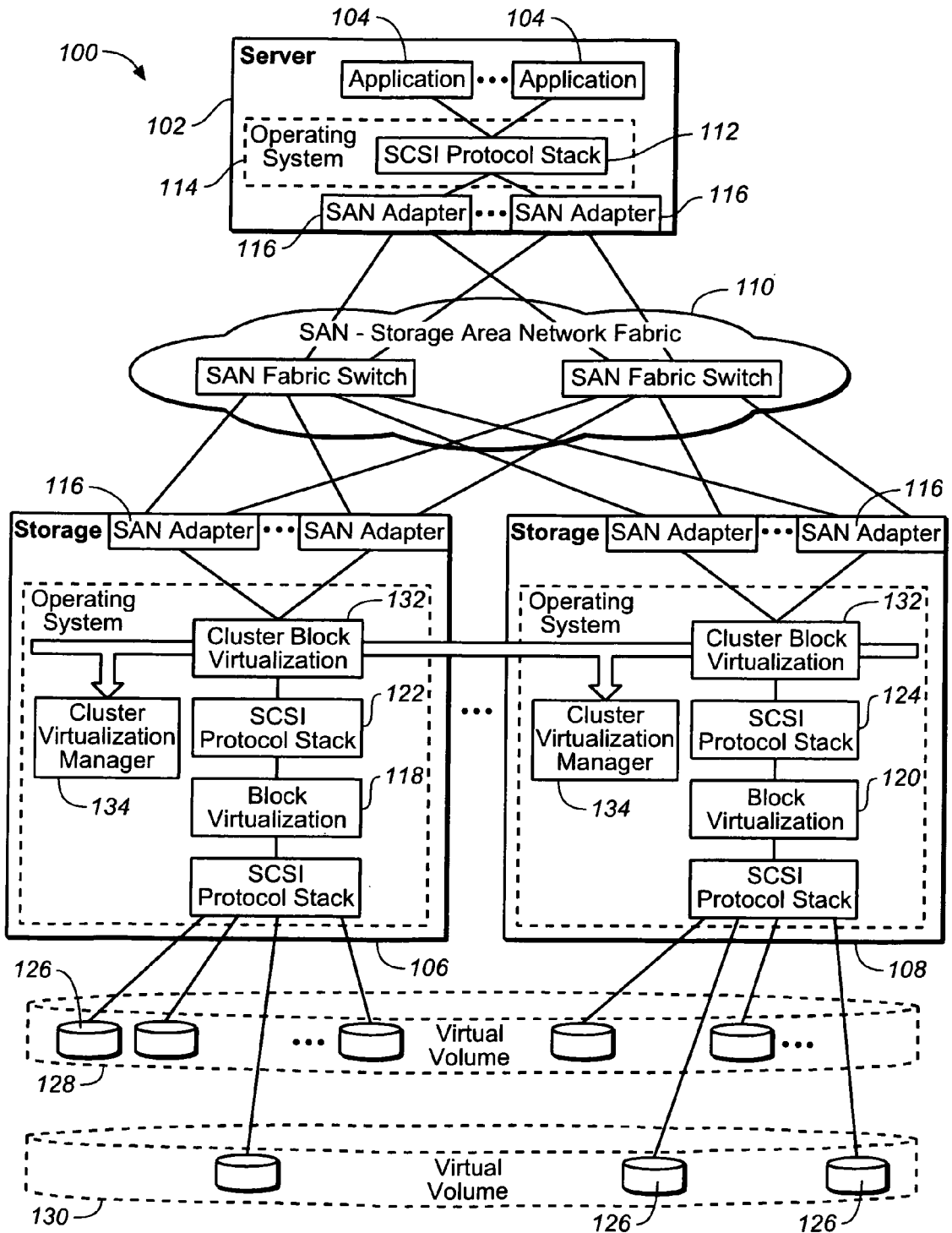
FIG. 1 is a block diagram of a networked storage implementation/system accessible via a block storage protocol in accordance with an exemplary embodiment of the present invention.

Reference will now be made in detail to the presently preferred embodiments of the invention, examples of which are illustrated in the accompanying drawings.

Referring generally to FIG. 1, a networked storage implementation/system accessible via a block storage protocol in accordance with an exemplary embodiment of the present invention is shown. For example, the block storage protocol may be a Small Computer System Interface (SCSI) protocol implemented over a network capable media transport, such as Fibre Channel, iSCSI, or Serial Attached SCSI (SAS). The invention may further be implemented in other block storage protocols, such as SCSI RDMA Protocol (SRP). The system/method of the present invention extends the block storage protocol to allow for distribution of data with a common logical block address space across multiple, discrete, cooperating storage systems which form a block storage cluster.

In the illustrated embodiment (shown in FIG. 1), the networked storage implementation/system/storage infrastructure 100 includes an application system/server 102. The application system 102 may run one or more applications 104. The applications 104 running on the application system 102 may access storage resources stored on one or more storage systems (106, 108) across/via/using a network (ex.—a storage area network (SAN) 110). The applications may use a block storage protocol stack (ex.—a Small Computer System Interface (SCSI) protocol stack) 112 of an operating system 114 of the server (without loss of generalization)

to access the storage resources/network storage resources. The operating system 114 of the server 102 may be directly running on server hardware or may run within a virtual machine in a virtualized environment without loss of generality.

In current embodiments of the present invention, the SCSI protocol stack 112 of the server 102 may present local (ex.—on the server) and remote (ex.—on the network) storage resources to the applications 104 as block storage devices/logical units/SCSI logical units. Each logical unit/SCSI logical unit may have a unique logical block address space. The remote storage resources/remote storage devices (106, 108) may be accessed by one or more SAN adapters 116 of the server 102 and/or storage systems (106, 108), which may run a network media transport protocol over which block storage protocol is mapped. For example, SCSI protocol may be mapped over various types of implementable network transports. Without loss of generalization, the SAN adapters 116 and their media transport protocol layer may be physical or virtual network adapters.

In exemplary embodiments of the present invention, the storage area network 110 may be implemented from any network media and transport protocol that allows port level addressing (ex.—Fibre Channel, EtherNet, InfiniBand, and Serial Attached SCSI (SAS)). Media transport layer protocols may handle all routing of protocol packets from end-point to end-point ports across network fabric 110. Without loss of generality, the network 110 may be implemented as a single fabric or multiple redundant fabrics. Preferably, network ports on the application system(s)/server(s) 102 are able to physically reach network ports on the storage system(s) (106, 108).

In further embodiments of the present invention, the storage system(s) (106, 108) may be a networked attached storage device(s). For instance, the storage systems (106, 108) may be general purpose computers, dedicated storage arrays or networked disk drives which make their local devices visible on the SAN 110. Storage resources of the storage system may be accessed via SAN ports which are running the media transport protocol layer. SCSI layer may use said SAN ports to communicate with the storage network as storage ports. Each storage system 106, 108 may include a local block virtualization layer (118, 120) which may apply data protection or block abstraction to its physical storage devices. For example, data protection such as Redundant Array of Inexpensive Disks (RAID) may be used on dedicated network storage systems. Each storage system 106, 108 may further include an internal block protocol stack (122, 124) which may access the actual attached physical storage devices 126 which it exports to the network 110.

The amount of storage available to application servers/application systems/servers 102 may be extended by adding more storage devices 126 to individual storage systems (106, 108), or by adding additional storage systems (106, 108) to the storage area network. When additional storage devices 126 are added to the individual storage systems (106, 108), the local block virtualization layers (118, 120) in the storage systems (106, 108) may be used to create larger virtual block storage devices (128, 130) from multiple physical disks (126). This may preserve the single logical block address space of virtual volumes (128, 130), but, at some point, the number of physical attachment points on the individual storage system(s) (106, 108) may be exhausted, thus providing a limitation on total capacity expansion. When storage systems are added to the storage area network, the total storage available to applications may be increased beyond the physical limits of a single storage system. However, storage provided by multiple storage systems (106, 108) may need to be combined into a common logical block address space for use by application server(s) (102).

A number of techniques may be utilized for creating a single name space/common logical block address space from storage resources 126 on multiple network attached storage systems (106, 108). For example, said techniques may use different storage protocols, such as clustered file systems or object storage protocols. Block storage cluster aggregation may be added to the storage network 110, such that block cluster aggregation may be provided by a cluster block virtualization device in each of a plurality of redundant SAN fabrics 110. The cluster block virtualization device may sit between a network storage system(s) and an application system(s). The cluster block virtualization device may import block storage logical units exported by the network storage systems/storage systems, and may create an additional layer of block virtualization by creating virtual volumes. The cluster block virtualization device may then export the virtual volumes as logical units to the application system(s). The application system does not see or access the logical units exported by the storage system, but rather, only sees the virtual volumes/cluster virtual volumes. The cluster physical structure discovery, virtualization mapping, and management may be provided by a cluster virtualization manager. The cluster virtualization manager may reside on a separate pair of redundant devices anywhere in or on the edge of the SAN. Without loss of generalization, the block storage cluster aggregation function may be distributed across the cluster block virtualization devices/block cluster virtualization devices.

Alternatively, block storage cluster aggregation/block cluster aggregation may be added to application system(s) 102 (application system aggregation). For example, block cluster aggregation may be provided by an additional abstraction layer added to the application system's block storage protocol stack. Numerous options may be implemented for placing said abstraction layer on the application system. The block virtualization layer may mask or hide logical units exported by the storage system(s) and may present virtual volumes to layers above the block virtualization layer in the block storage protocol stack. Unlike when block storage cluster aggregation is added to the storage area network (network aggregation), when adding block storage cluster aggregation to application systems, logical units exported by the storage system(s) are accessible to application system(s)/server(s). The block virtualization layer may hide access to said logical units from applications running on the application system(s)/server(s). Like network aggregation, when block cluster aggregation is added to the application system(s), a cluster virtualization manager function may be present for discovering storage resources in the cluster and for distributing virtualization mapping across the application server(s). One variation of this management approach may include having separate cluster virtualization configuration in each server, which may prevent virtual volumes from being shared across application servers. Alternatively, to provide sharing of the virtual volumes, a cluster-wide virtualization manager may be required.

In the illustrated embodiment of the present invention (as shown in FIG. 1), block storage cluster aggregation may be added to the storage system(s) (106, 108) (storage system aggregation). The block cluster aggregation may be provided by a cluster block virtualization layer(s) 132 added to the block protocol stacks (122, 124) of one or both storage systems (106, 108). The cluster block virtualization layer 132 may combine storage devices 126 on local and remote storage systems into virtual volumes (128, 130). The storage devices 126 on each storage system (106, 108) in the cluster are detectable by/visible to one or more of the other storage systems (ex.—the storage devices of storage system 106 are visible to storage system 108 and the storage devices of storage system 108 are visible to storage system 106) to allow for creation of virtual volumes (128, 130) by the cluster block virtualization layer 132. In a number of storage system aggregation implementations, only virtual volumes (128, 130) are exported by the cluster block virtualization layer 132 to application system(s) 102 over the storage area network 110. In some networked storage implementations, an Input/Output (I/O) request arriving at a storage system (106 or 108) which requires data from one or more different storage systems may be forwarded to the correct storage system(s) to satisfy the I/O request. A number of technologies may be implemented to perform I/O redirection, such as proxy I/O and command forwarding. As with other block storage cluster techniques described above, in storage system aggregation, a separate cluster virtualization manager function 134 may be required to exist on at least one of the storage systems (106, 108) in the storage infrastructure. Without loss of generality, said cluster virtualization manager function 134 may be distributed across the storage systems (106, 108) in the cluster, thereby providing a low cost, low invasiveness implementation of the storage management function.

The above-described methods/implementations for creating block storage clusters provide a number of useful features. For instance, block storage volumes may be spread across multiple storage systems (106, 108). Also, application system(s) 102 may access data from any storage system in the cluster. Still further, the virtual volumes (128, 130) may provide a common block address space across all storage nodes/storage systems (106, 108). However, each of the above methods/implementations (network aggregation, storage system aggregation, application system aggregation) have different disadvantages.

Storage aggregation in the network 110 (network aggregation) may be disadvantageous in that it may require additional special purpose components in the network 110. Said special purpose components may add cost to the network fabric 110 and may force a high cost moving from a single storage system to a multiple system storage cluster. Further, if storage aggregation devices are not included in the network fabric when it is created to minimize the overall cost, the network may need to be re-cabled in order to incorporate the aggregation devices and cluster virtualization manager. Still further, migrating from a single storage system to a storage cluster may require reconfiguration of all application systems to use virtual volumes instead of the original volumes from the storage systems.

Storage aggregation on the application server 102 (application system aggregation) may be disadvantageous in that it may require that additional components be added to the server block storage stack 112. Said components may be required to mask all non-virtual logical units from access by the applications 104 running on the system. If masking is not complete for all operating systems 114 accessing the cluster, data corruption or loss may occur due to unregulated access to the non-virtual logical units. The cluster block virtualization layer in the application system may also be required to provide block virtualization for the applications. Unique cluster block virtualization components may be required for each operating system. These unique cluster block virtualization components may be forced to use undocumented interfaces in the system's storage stack to accomplish their function, which may create an explosion of configurations that need to be maintained and tested. Further, the cluster virtualization manager may still require an external system separate from the application systems. If the cluster virtualization manager is placed on an application system, it may consume resources which could be used for applications and, said cluster virtualization manager may still be required to communicate with all other application systems in the infrastructure. Regardless of storage virtualization manager location, a separate protocol may be needed to distribute and update block storage maps maintained by the cluster virtualization manager and used by the cluster block virtualization layer in the application system.

Storage aggregation in the storage system(s) (106, 108) (storage system aggregation) may eliminate the cost of additional network components. Storage system aggregation may further eliminate the impact on the application server 102 of additional components in the storage stack 112 and may also eliminate the impact of the storage virtualization manager running on the application server 102. Storage system aggregation may allow all components needed for the block storage cluster/for block storage clustering to be located on the storage systems (106, 108). Storage system aggregation may require that I/O requests be redirected when they are sent to the wrong storage system. As previously mentioned, proxy I/O and/or command forwarding may be used for redirecting, however, both have their drawbacks. When proxy I/O is used, this may add an additional store and forward delay to route data through the storage system receiving the original misdirected request. Command forwarding across a private storage cluster interconnect may add additional cost to the storage cluster and may limit the maximum size of the cluster.

The present invention overcomes the weaknesses of the above-described block storage cluster techniques by providing a SCSI referral technique/method for use with a networked storage implementation/system, such as said implementation/system 100 illustrated in FIG. 1. The technique/method of the present invention is designed to allow for the creation of block storage cluster(s) without the need for non-standard components in the application system block storage stack 112 or additional special-purpose cluster devices in the storage network 110.

Referring generally to FIG. 3, a method for data transfer via a networked storage implementation (ex.—a method for communication between an initiator system/initiator and a block storage cluster in accordance with an exemplary embodiment of the present invention is shown. For example, the method may implement techniques for block storage clustering using a storage protocol command and reply sequence (ex.—such as a SCSI command/response remote procedure call model) as described below (and as shown in FIGS. 2 and 3). In a current embodiment of the present invention, the method 300 includes the step of receiving a command at a first storage system included in a plurality of storage systems of the block storage cluster 302. For example, the block storage cluster may include two or more storage systems (106, 108) each communicatively coupled with/including physical storage device(s) 126. Further, the command may be transmitted by an initiator/initiator system/host/server 102 to the first storage system 106 (ex.—a target system/target) via a storage area network 110. In exemplary embodiments, the command may be an I/O request, such as a request for data (ex.—read request). In further embodiments, the target may be any storage system in the block storage cluster and the command may be sent using any port (ex.—the primary port, as shown in FIG. 2) on any prospective target storage system in the block storage cluster. Still further, the command may be a SCSI command, the initiator/initiator system 102 may be a SCSI initiator, and the target (ex.—first storage system 106) may be a SCSI target.

In additional embodiments, when sent over the storage area network 110/network transport, the command may be transmitted on an established initiator and target association (ex.—an I_T Nexus). In SCSI protocol, the I_T Nexus between the initiator and target may be established between a SCSI port on the initiator (ex.—a SCSI port of the server/application system 102) and a SCSI port on the target (ex.—a SCSI port of the first storage system 106). A block storage cluster with multiple storage systems may provide a unique port identifier for each port on all storage systems in the cluster. In addition, each SCSI command may identify the data to be transferred by its starting address and length in the volume's logical block address space.

In exemplary embodiments, the method 300 may further include the step of transferring data requested in the data request which is stored on the first storage system to the initiator system via the storage area network 304. In current embodiments of the present invention, any part of the requested data which is stored in/resides on the storage system receiving the command (ex.—the target storage system) may be moved to/transferred to the initiator. For instance, data may be moved between the target 106 and the initiator 102 via a series of SCSI data transfer steps over the above-mentioned/same I_T Nexus (ex.—the data stored on the first storage system 106 may be transferred to the application system/initiator system 102). In current embodiments of the present invention, data may flow in either or both directions between the initiator and target as required by the particular SCSI command.

In further embodiments of the present invention, the method 300 may further include the step of transmitting a referral response from the first storage system to the initiator system when a portion of the data requested in the data request is not stored by/does not reside on the first storage system, but is stored by/does reside on a second storage system included in the plurality of storage systems of the block storage cluster 306. In exemplary embodiments, the referral response may provide an indication to the initiator that not all of the data requested in the original data request was transferred, the referral response may provide information for directing the initiator system to the second storage system, and/or the referral response may indicate/provide an indicator to the initiator system that one or more other storage systems of the cluster (ex.—the second storage system 108) stores said portion of/remainder of the data. For instance, the referral response may include a list of referrals to one or more other storage systems/cluster nodes (ex.—such as the second storage system 108) of the cluster where the remainder of the requested data (ex.—remainder of the data requested in the original data request received at step 302) is located/stored.

As mentioned above, there is a referral for each additional cluster node/storage system where data must be obtained by the initiator for fulfilling the original data request. In current embodiments of the present invention, each referral of the referral list may include the following information (as shown in FIG. 4) for each storage system/node which it is referring the initiator to: a port identifier (ex—associated with a port on a cluster node/storage system which contains at least some of the remainder of the data requested in the original data request; an offset (ex.—the logical block address of a first byte of data on its associated storage system/storage node); and a length (ex—an amount of data to be transferred for the referral). Other information needed to complete a referral, such as volume, logical unit, and target are available from the context of the command which generated the SCSI referral.

In exemplary embodiments of the present invention, the method 300 further includes receiving a second command at the second storage system 308. For instance, in response to receiving the list of referral(s), the initiator 102 may transmit the second command (ex.—via the storage area network) to one of the other storage system(s) of the cluster which are identified in the referral list as storing at least a portion of the remainder of the data. For example, the initiator may transmit the second command (ex.—which may be based upon the referral response) to a port identified in the referral list, said port being associated with said second system. In further embodiments, the block storage protocol initiator 102 may send separate commands to all other storage systems in the cluster which hold data requested in the original request by using the ports indicated in the referral list (ex.—secondary ports).

In further embodiments of the present invention, the method 300 further includes the step of transferring said stored portion of the requested data from the second storage system to the initiator system via the storage area network 310. For example, the initiator 102, as mentioned above, may send command(s) to all other storage systems (ex.—storage system 108) in the cluster which hold data requested in the original request by using the ports indicated in the referral list (ex.—secondary ports), said storage systems send their local data back to the initiator along with a status indicating that their local data has been transferred. After all data transfers in response to commands issued based on said referrals have been completed, the block storage protocol may complete the operation by returning to its caller.

In alternative embodiments of the present invention where all of the data requested in the original data request (of step 302) was stored by and was transferred by the first storage system, the method 300 may further include the step of, transmitting a transfer complete response from the first storage system to the initiator system, said transfer complete response indicating that all of the data requested in the data request was transferred 312. In further embodiments, when all data responsive to a command has been transferred or if an error condition occurs in either the command or data transfer, the SCSI target may complete the operation by returning/transmitting a SCSI response including a command status to the initiator (method step 314).

To support the present invention, the block storage cluster technique may be required to provide a number of attributes. For example, the block storage protocol target may be required to be distributed across all storage systems (106, 108) in the cluster. Further, all ports on all storage systems in the cluster may be required to have unique port identifiers. Still further, a logical block address space for a virtual volume may be required to be common across all storage systems on which the virtual volume exists. Additionally, it may be required that the cluster block virtualization function (134) on all storage systems (106, 108) be able to determine which storage system in the cluster holds which address ranges of data within virtual volumes (128, 130).

As discussed above, the method of the present invention may be implemented in block storage clusters that provide block virtualization on the storage system(s) (106, 108). In exemplary embodiments, the system/method of the present invention, rather than utilizing command forwarding or proxy I/O, implements cluster block virtualization (132, 134) which indicates that data resides on other cluster nodes by completing its local data transfer with status information containing a SCSI check condition and a list of referrals in SCSI sense data.

In further embodiments, the SCSI initiator 102 may be configured to detect a new check condition, issue new SCSI commands for each referral, and track when all referrals are completed. The initiator 102 may further be configured for accumulating data retrieved via referrals across multiple initiator-target nexes.

The system/method of the present invention provides a number of advantages over current block storage cluster approaches. First, no additional hardware is needed in the storage infrastructure in order to support clustering. As is the case with host agent and storage system resident block virtualization, no hardware needs to be added to the SAN 110. Further, discovery of targets and logical units may be unchanged for an initiator 102, the target may be visible on all nodes of the storage cluster, and all nodes of the storage cluster are configured for determining which logical units are available through the target. Still further, there is no need to hide non-virtualized volumes from initiators and only virtualized volumes are exported from the storage systems in the cluster. Additionally, the initiator does not need to retain information about the distribution of data in the cluster. The initiator/host 102 of the present invention is configured for determining where data resides in the cluster. Data may be requested from any port on any node in the cluster. The referral directs the initiator to the cluster node holding the data. Further, data on storage systems (106, 108) may be moved without informing initiators, because, if an initiator attempts to access data via a port on a wrong cluster node, the initiator is simply redirected (by the referral) to a port on a cluster node which contains the data. Still further, the method of the present invention may be applied to an arbitrary number of storage devices, as opposed to storage virtualization in the SAN 110, which is limited to the capacity of the hardware added to the SAN. Additionally, the method of the present invention may be applied to storage clusters with multiple ports on a cluster node. If data is accessible via more than one path, the referral only needs to include a single port via which the data may be accessed. Implementing the present invention in a standard storage protocol may be advantageous in that no unique software installation in the block storage protocol stack on the initiator systems may be required.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for communication between an initiator system and a block storage cluster, comprising:
    receiving a command at a first storage system included in a plurality of storage systems of the block storage cluster, the command being transmitted by the initiator system to the first storage system via a network, the command including a request for data;
    when data requested in the data request is stored by the first storage system, transferring said stored data from the first storage system to the initiator system via the network; and
    when a portion of the data requested in the data request is not stored by the first storage system, but is stored by a second storage system included in the plurality of storage systems of the block storage cluster, transmitting a referral response from the first storage system to the initiator system,
    wherein the referral response provides an indication to the initiator system that not all of the requested data was transferred and further provides information for directing the initiator system to the second storage system.

2. A method as claimed in claim 1, further comprising:
    when all of the data requested in the data request is stored by the first storage system and is transferred by the first storage system to the initiator system, transmitting a transfer complete response from the first storage system to the initiator system indicating that all of the data requested in the data request was transferred.

3. A method as claimed in claim 1, further comprising:
    when one of: an error condition occurs in the command; and an error condition occurs when the stored data is transferred, the first storage system completes operation by transmitting an error response including a command status to the initiator system.

4. A method as claimed in claim 1, further comprising:
    receiving a second command at the second storage system, the second command being transmitted by the initiator system to the second storage system via the network, the second command based on said transmitted referral response, the second command requesting said portion of the requested data stored by the second storage system.

5. A method as claimed in claim 4, further comprising:
    transferring said stored portion of the requested data from the second storage system to the initiator system via the network.

6. A method as claimed in claim 1, wherein the referral response provides an indication to the initiator that said portion of the requested data was not transferred.

7. A method as claimed in claim 1, wherein the referral response includes a port identifier, said port identifier identifying a port of the second storage system via which the data portion stored on the second storage system is accessible.

8. A method as claimed in claim 1, wherein the command is a Small Computer Systems Interface (SCSI) command, the first storage system is a SCSI storage system, and the initiator system is a SCSI initiator system.

9. A method as claimed in claim 1, wherein the referral response includes a port identifier associated with a port of the second storage system, a logical block address of a first byte of the portion of the data stored on the second storage system, and a length of the portion of the data stored on the second storage system.

10. A method as claimed in claim 1, wherein the referral response includes status information containing a check condition, said referral response further including sense data including a list of referrals.

11. A method as claimed in claim 8, wherein the SCSI command identifies the requested data by a starting address of the data and a length of the data in a volume logical block address space.

12. A method as claimed in claim 11, wherein the command is transmitted via the network on an I_T Nexus.

13. A method as claimed in claim 12, wherein the stored data is transferred via the I_T Nexus.

14. A method as claimed in claim 12, wherein the I_T Nexus is established between a SCSI port of the initiator system and a SCSI port of the first storage system.

15. A method as claimed in claim 14, wherein each port of the first storage system includes a unique SCSI identifier.

16. A non-transitory computer-readable medium having computer-executable instructions for performing a method for communication between an initiator system and a block storage duster, said method comprising:
receiving a command at a first storage system included in a plurality of storage systems of the block storage duster, the command being transmitted by the initiator system to the first storage system via a network, the command including a request for data;
when data requested in the data request is stored by the first storage system, transferring said stored data from the first storage system to the initiator system via the network; and
when a portion of the data requested in the data request is not stored by the first storage system, but is stored by a second storage system included in the plurality of storage systems of the block storage duster, transmitting a referral response from the first storage system to the initiator system,
wherein the referral response provides an indication to the initiator system that not at of the requested data was transferred and further indicates to the initiator system that the second storage system stores said portion of the data.

17. A non-transitory computer-readable medium as claimed in claim 16, said method further comprising:
when art of the data requested in the data request is stored by the first storage system and is transferred by the first storage system to the initiator system, transmitting a transfer complete response from the first storage system to the initiator system indicating that art of the data requested in the data request was transferred.

18. A non-transitory computer-readable medium as claimed in claim 16, said method further comprising:
when one of: an error condition occurs in the command; and an error condition occurs when the stored data is transferred, the first storage system completes operation by transmitting an error response including a command status to the initiator system.

19. A non-transitory computer-readable medium as claimed in claim 16, said method further comprising:
receiving a second command at the second storage system, the second command being transmitted by the initiator system to the second storage system via the network,
the second command requesting said portion of the requested data stored by the second storage system; and
transferring said stored portion of the requested data from the second storage system to the initiator system via the network.

20. A processor-based system, comprising:
means for receiving a command at a first storage system included in a plurality of storage systems of the block storage duster, the command being transmitted by the initiator system to the first storage system, the command including a request for data;
when data requested in the data request is stored by the first storage system, means for transferring said stored data from the first storage system to the initiator system; and
when a portion of the data requested in the data request is not stored by the first storage system, but is stored by a second storage system included in the plurality of storage systems of the block storage duster, means for transmitting a referral response from the first storage system to the initiator system,
wherein the referral response provides an indication to the initiator system that not at of the requested data was transferred and further provides information for directing the initiator system to the second storage system.

* * * * *